United States Patent [19]
Toyoda

[11] 3,950,768
[45] Apr. 13, 1976

[54] CAMERAS EMPLOYING INTERCHANGEABLE AUTOMATIC EXPOSURE CONTROL DEVICES

[75] Inventor: Kenji Toyoda, Kawasaki, Japan
[73] Assignee: Nippon Kogaku K.K., Tokyo, Japan
[22] Filed: Dec. 3, 1974
[21] Appl. No.: 529,074

[30] Foreign Application Priority Data
Dec. 6, 1973  Japan.............................. 48-135695

[52] U.S. Cl................. 354/51; 354/60 R; 354/152; 354/288
[51] Int. Cl.²..................... G03B 7/08; G03B 17/00
[58] Field of Search ....... 354/48, 50, 51, 60 R, 152, 354/288

[56] References Cited
UNITED STATES PATENTS
3,733,984  5/1973  Yato ..................................... 354/51
3,812,499  5/1974  Hayashi et al. .................. 354/51 X

*Primary Examiner*—Joseph F. Peters, Jr.
*Attorney, Agent, or Firm*—Shapiro and Shapiro

[57] ABSTRACT

Automatic exposure time control apparatus in an interchangeable pentaprism device and manually adjustable exposure time control apparatus in a camera body are selectively operable and employ separate switching circuits which, after opening of the shutter, are responsive to associated time-varying signals for de-energizing an electromagnet in the camera body at the end of the corresponding exposure time interval, thereby to release a shutter-closing member.

14 Claims, 4 Drawing Figures

CAMERAS EMPLOYING INTERCHANGEABLE AUTOMATIC EXPOSURE CONTROL DEVICES

BACKGROUND OF THE INVENTION

1. Field of the Invention

This invention relates to interchangeable automatic exposure control apparatus for cameras having electric shutters, and is more particularly directed to interchangeable pentaprism devices employing such apparatus.

2. Description of the Prior Art

Single lens reflex camera having viewfinders constructed to employ different, interchangeable pentaprism devices so that the same camera body can be used for different types of photography are well known.

It has been proposed in the prior art to provide, for mounting on a camera body containing a manually adjustable exposure control circuit, a pentaprism device having a light-metering circuit for providing an electrical signal corresponding to the light intensity and a storage circuit for storing the electrical signal which is present immediately before opening of the shutter, thereby to form a camera having automatic control of the shutter speed. However, for the reasons set forth below, the accuracy of such control heretofore has been unsatisfactory. The manually adjustable exposure time control apparatus contained in such a camera body includes an RC network for providing, upon opening of the shutter, an electrical signal which varies with time in accordance with various manually preset exposure factors, such as the light intensity and the film speed. The control apparatus further includes a switching circuit which de-energizes an electromagnet to release a shutter-closing member when the time-varying electrical signal reaches a predetermined threshold value (i.e., the "trigger level"). However, due to the manufacturing tolerances for the values of the resistor and capacitor which form the RC network, the characteristic of the time-varying signal is not precisely the same for different exposure control circuits. The differences between characteristics of the different time-varying signals have been compensated for by suitable adjustment of the threshold values of the associated switching circuits so that different control circuits provide precisely the same shutter speed under identical exposure conditions. Thus, the threshold values of the switching circuits in different camera bodies are not the same. As a result, when a pentaprism device of the type described above is mounted on different camera bodies having such exposure control apparatus in order to provide cameras in which the time-varying signal is varied automatically in accordance with the light intensity, the shutter speed of the different cameras in the automatic mode will not be the same under identical exposure conditions.

To avoid this problem, it has been proposed to provide the pentaprism device with a voltage divider for setting the threshold value of the switching circuit in the camera body when it is desired to provide automatic exposure control, the camera body being provided with its own voltage divider for setting a different threshold value when it is desired to provide manual exposure control. This method requires a change-over switch of complicated construction for selecting the manual and automatic modes of operation. Moreover, the accuracy of the shutter speed provided by this pentaprism device in the automatic mode is still unsatisfactory, because the trigger level of the switching circuit is determined not only by the threshold voltage applied thereto, but also by the value of the offset voltage of the switching circuit. This offset voltage, which is the minimum voltage difference which can be applied between the two input terminals of the switching circuit to cause the switching circuit to be operated or switched, is determined by the values of the electrical components forming the switching circuit. Due to the manufacturing tolerances for these components, the offset voltage will not be the same for the switching circuits in different camera bodies. Consequently, when a pentaprism device of this type of mounted on different camera bodies, the shutter speed in the automatic mode will not be the same under identical exposure conditions.

SUMMARY OF THE INVENTION

It is accordingly a principal object of the invention to provide interchangeable automatic exposure control devices which, when mounted on different camera bodies containing manually adjustable exposure time control apparatus, provide accurate, reliable, automatic control of the shutter speed.

Another object of the invention is to provide improved cameras employing interchangeable devices of the above-described type.

Still another object of the invention is to provide improved exposure control apparatus in camera bodies constructed to receive interchangeable devices of the above-described type.

The automatic exposure control devices in accordance with the invention are designed for use with camera bodies containing a shutter, a shutter-releasing mechanism actuatable to open the shutter, a trigger switch adapted to be operated in response to actuation of the shutter-releasing mechanism, manually adjustable exposure time control circuitry which is responsive to operation of the switch and which includes a first switching circuit for providing a first control signal representative of a selected exposure time interval, and a shutter-closing mechanism, employing an electromagnet, responsive to the first control signal for closing the shutter at the end of the selected exposure time interval.

In the preferred form, the interchangeable automatic exposure control devices of the invention comprise interchangeable pentaprism devices which include automatic shutter speed control apparatus constructed in accordance with the invention. The control apparatus comprises light-metering circuitry for producing an electrical signal corresponding to the brightness of an image to be photographed and automatic exposure time control circuitry which, when the pentaprism device is mounted on a camera body, is responsive to the electrical signal and to operation of the trigger switch in the camera body and which includes a second switching circuit for producing a second control signal representative of the exposure time interval required for proper exposure. The shutter-closing mechanism is responsive to the second control signal for closing the shutter at the end of the required exposure time interval. The camera body preferably includes a memory switch adapted to be operated in response to actuation of the shutter-releasing mechanism prior to operation of the trigger switch, and the light-metering circuitry in the pentaprism device includes a storage circuit responsive to operation of the memory switch for storing the electrical signal, the automatic exposure time control circuitry being responsive to the stored signal and to operation of the trigger switch for generating the second control signal.

In the preferred embodiments of the pentaprism device, the automatic exposure time control circuitry comprises means, such as an RC network, for providing a signal having an amplitude which varies with time after opening of the shutter and means for providing a reference signal, one of these signals having an amplitude which varies in accordance with the value of the stored signal. The second switching circuit provides the second control signal in accordance with the relative amplitudes of the two signals. More particularly, the switching circuit provides an energizing current to an electromagnet in the camera body until the time-varying signal differs in amplitude from the reference signal by the offset voltage of the switching circuit, at which time the electromagnet is de-energized to release a shutter-closing member in the camera body. The relative amplitudes of the time-varying and reference signals are adjustable by means of a variable resistor in order to compensate for differences in the offset voltages of the switching circuits in different pentaprism devices.

With the pentaprism device mounted on the camera body, selection of either the manual or automatic mode of exposure control is effected by change-over switches provided on the camera body for selectively connecting the trigger switch and a source of operating potential contained in the camera body to the appropriate exposure control circuitry. In one of the preferred embodiments, the camera body has a first power switch responsive to film advance for connecting the source of operating potential to the light-metering circuitry and has a second power switch responsive to subsequent actuation of the shutter-release mechanism for connecting the source to the selected exposure time control circuitry.

BRIEF DESCRIPTION OF THE DRAWINGS

The invention will be further described with reference to the accompanying drawings, which illustrate preferred and exemplary embodiments, and wherein.

DESCRIPTION OF THE PREFERRED EMBODIMENTS

Figure 1:
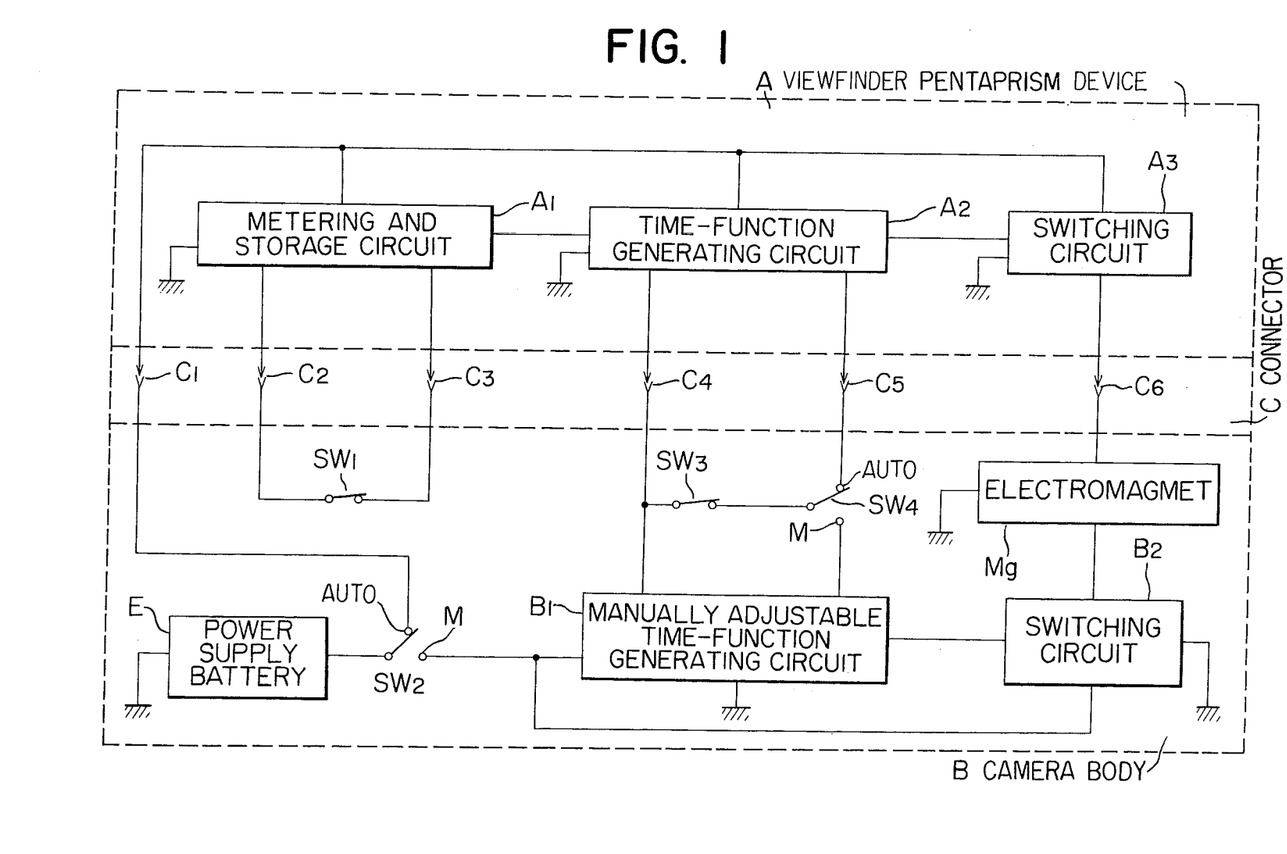
FIG. 1 is an electrical circuit diagram showing, in block form, the circuitry employed in a pentaprism device and associated camera body in a first embodiment of a camera in accordance with the invention.
Figure 2:
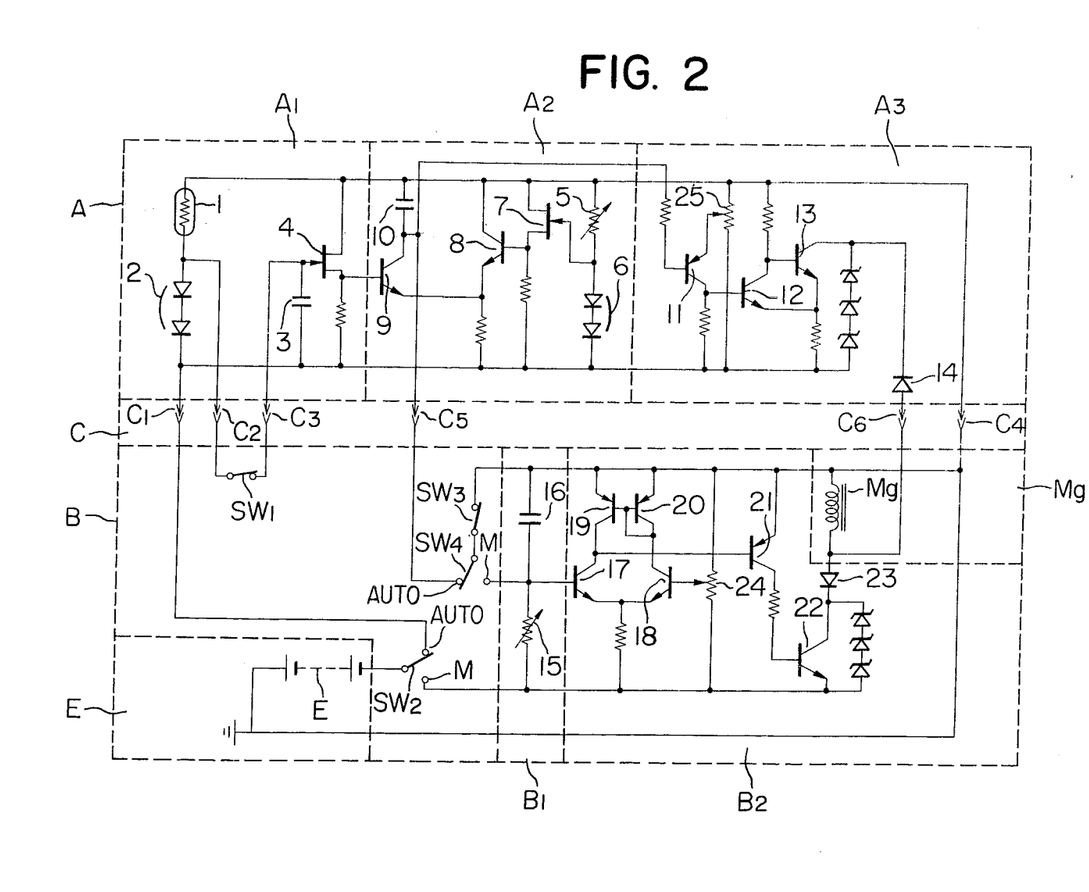
FIG. 2 is a schematic diagram of the circuitry of FIG. 1.

Referring to FIGS. 1 and 2, a first embodiment of a camera constructed in accordance with the invention employs an interchangeable pentaprism device A which, when mounted on a camera body B, forms part of the view-finding optical system of the camera. In addition to a shutter (not shown) and a shutter-releasing mechanism (not shown), both of known construction, the camera body contains a manually operable shutter speed control circuit comprising manually adjustable exposure time control circuits B1 and B2 and an electromagnet Mg, described hereinafter. The camera body also contains a power supply battery E and four switches SW1, SW2, SW3, and SW4. Circuit B1 is a manually adjustable time-function generating circuit which includes an RC time constant network in which the capacitor begins to be charged through the resistor upon opening of the trigger switch SW3, to be described. The capacitance of the capacitor and/or the resistance of the resistor are manually adjustable to select a charging time constant which will provide the desired shutter speed. Circuit B2 comprises a switching circuit which provides a control signal to initiate closing of the shutter when the potential across the capacitor reaches a predetermined threshold value, which occurs after the shutter has been open for the desired exposure time interval. In the illustrated form of the invention, this control signal comprises a current which is supplied to energize electromagnet Mg during the desired exposure time interval and which is then cut off to de-energize the electromagnet. When energized, the electromagnet restrains shutter closing member (not shown) to enable the shutter, once opened, to remain open. When de-energized, the electromagnet releases the shutter-closing member to close the shutter.

Memory switch SW1, which is normally closed, is opened in response to operation of the shutter-releasing mechanism, such as by being responsive to upward movement of a mirror (not shown) within the camera body. Trigger switch SW3 opens a short time thereafter, simultaneously with opening of the shutter.

The pentaprism device A made in accordance with the invention and adapted to be mounted on camera body B has an optical system (not shown), such as a pentaprism and an eyepiece, and has automatic shutter speed control circuits A1, A2, and A3 which, when the pentaprism device is mounted on the camera body, are cooperable with electromagnet Mg in the camera body to provide a camera having automatic control of the shutter speed. Circuit A1 comprises a metering and storage circuit responsive to the light passed through the view-finding optical system for generating an electrical signal representative of the brightness of an object to be photographed and responsive to opening of memory switch SW1 for storing the electrical signal corresponding to the brightness measured immediately before opening of the memory switch. Automatic exposure time control circuitry, comprising circuits A2 and A3, is responsive to the stored signal and to operation of trigger switch SW3 for providing a control signal representing the exposure time required for proper exposure of the camera film. Specifically, circuit A2 comprises a time-function generating circuit for generating a signal having an amplitude which varies with time after operation of trigger switch SW3 (i.e., after opening of the shutter). Circuit A3 comprises a switching circuit for providing an energizing current to electromagnet Mg in the camera body until such time as the magnitude of the time-varying signal reaches a predetermined threshold value or trigger level, the switching circuit thereafter de-energizing electromagnet Mg to actuate the shutter-closing member.

Change-over switches SW2 and SW4 are provided to enable selection of the manual and automatic modes of operation, each change-over switch having a contact designated M which is selected for operation in the manual mode and a contact designated "AUTO" which is selected for operation in the automatic mode. Switch SW2 enables the power supply battery to be selectively connected to the manually adjustable exposure control circuits and to the automatic exposure control circuits, while change-over switch SW4 enables selective connection of the trigger switch SW3 between associated input terminals of circuit B1 in the camera body and circuit A2 in the pentaprism device. Both change-over switches are adapted to be operated at the same time and may be ganged together for this purpose.

When change-over switch SW2 is set to its M contact, one of the output terminals of power supply battery E is connected to respective power input terminals of circuits B1 and B2 in the camera body, the other power input terminals of these circuits and one of the input terminals of electromagnet Mg being connected to the other output terminal of battery E through ground. When change-over switch SW4 is set to its M contact, the opposite terminals of trigger switch SW3 are connected to corresponding input terminals of circuit B1.

The pentaprism device A and camera body B are removably connected to each other in a known manner. When the pentaprism device is mounted on the camera body, circuit elements in the pentaprism device and in the camera body are electrically connected together by a connector C, which includes six pairs of mutually engageable connector terminals C1, C2, C3, C4, C5, and C6. Connector terminals C1 provide a connection between one terminal of power supply battery E and respective power supply input terminals of circuits A1, A2, and A3 in the pentaprism device when change-over switch SW2 is set to its AUTO contact, the other power input terminals of these circuits being connected to ground. Connector terminals C2 and C3 provide a connection between opposite terminals of memory switch SW1 in the camera body and the corresponding input terminals of metering and storage circuit A1 in the pentaprism device. Connector terminals C4 and C5 connect the opposite terminals of trigger switch SW3 to corresponding input terminals of time-function generating circuit A2 when the change-over switch SW4 is set to the AUTO contact. Connector terminals C6 provide a connection between the ungrounded terminal of electromagnet Mg and an output terminal of switching circuit A3.

Referring to FIG. 2, with the pentaprism device mounted on the camera body, automatic exposure control is provided by setting both change-over switches SW2 and SW4 to their AUTO contacts. In this position, change-over switch SW2 connects the negative output terminal of the power supply battery E to circuits A1, A2, and A3 through connector terminals C1, the positive output terminal of the battery (which is at ground potential) being connected to these circuits through the terminals C4. One terminal of trigger switch SW3 is connected through change-over switch SW4 and through connector terminals C5 to time-function generating circuit A2, the other terminal of the trigger switch being connected to ground.

Light from an object to be photographed passes through the view-finding optical system of the camera and strikes a photoconductive element 1 which is connected in series with logarithmic diodes 2 between the output terminals of the battery through change-over switch SW2. The voltage of the electrical signal at the junction of the photoconductive element and the diodes is proportional to the logarithm of the brightness of the object. This voltage is applied through connector terminals C2 and C3 and through memory switch SW1 (which is in closed position) to one side of a storage capacitor 3.

The other side of the capacitor is connected to the negative terminal of the power supply battery through change-over switch SW2. Upward movement of the mirror in the camera body in response to actuation of the shutter-release mechanism causes memory switch SW1 to open, thereby disconnecting the photoconductive element 1 from the storage capacitor so that the capacitor stores a voltage corresponding to the light intensity striking the photoconductive element immediately before opening of the memory switch. This voltage is applied to the gate terminal of a source-follower circuit provided by a field effect transistor 4. Elements 1 through 4 just described form the metering and storage circuit A1 of the pentaprism device.

The f-stop of the picture-taking lens (not shown) of the camera and the film sensitivity are preset by suitable adjustment of the resistance value of an adjustable resistor 5, which is connected in series with logarithmic diodes 5 between the output terminals of the power supply battery through change-over switch SW2. The logarithmically compressed voltage provided at the junction of resistor 5 and diodes 6 is applied to the gate input of another source-follower circuit, which includes field effect transistor 7. The output voltage of this source-follower circuit is applied through an emitter-follower, which includes transistor 8, to the emitter of a logarithmic expansion transistor 9. A capacitor 10 connected between the collector of transistor 9 and ground is short-circuited by change-over switch SW4 and trigger switch SW3, which is in closed condition at this time. The base of transistor 9 receives the output of metering and storage circuit A1 (i.e., the output of the spaced follower including transistor 4) so that transistor 9 produces a constant collector current which is an exponential function of the magnitude of the voltage stored on capacitor 3. Thus, the collector current of transistor 9 is directly proportional to the intensity of light striking photoconductive element 1 immediately before opening of the shutter, the constant of proportionality being determined by the output voltage of the emitter-follower circuit provided by transistor 8.

After the mirror in the camera body has been moved fully upward and simultaneously with opening of the shutter, trigger switch SW3 opens, thereby permitting capacitor 10 to begin being charged by the collector current of transistor 9. Thus, the voltage across the capacitor increases with time at a rate determined by the voltage stored on capacitor 3 and by the setting of resistor 5. Circuit elements 5 through 10 just described comprise the time-function generating circuit A2 of the pentaprism device.

The electrical signal voltage at the collector of transistor 9, which decreases as the voltage across capacitor 10 increases, is applied to the input terminal of switching circuit A3, which comprises a Schmitt trigger circuit including transistors 11, 12 and 13. The center tap of an adjustable resistor or potentiometer 25, which is connected between the output terminals of the battery through change-over switch SW2, provides a reference signal for the trigger circuit, the threshold voltage or trigger level of the circuit being determined by the voltage of the reference signal and by the offset voltage of the trigger circuit. Transistor 13, which was rendered conductive when the change-over switch SW2 was set to the AUTO side, provides an energizing current to electromagnet Mg in the camera body, thereby restraining the shutter-closing member. When the voltage across capacitor 10 reaches a particular level, the voltage at the collector of transistor 9 drops relative to the reference signal to a valve below the trigger level of the Schmitt trigger circuit, causing transistor 13 to become non-conductive so that the electromagnet is de-energized to release the shutter-closing member. After closing of the shutter, memory switch SW1 and trigger switch SW3 are closed. The time interval between the closing of trigger switch SW1 and the switching of transistor 13 into non-conduction (i.e., the exposure time interval) corresponds to the magnitude of the charging current, which is determined by the voltage stored on capacitor 3 and by the setting of resistor 5. Thus, with resistor 5 set to a value corresponding to the film sensitivity and the f-stop of the picture-taking lens, the exposure time interval is automatically controlled in accordance with the brightness of the object to be photographed.

To provide manual exposure time control, with the pentaprism device being mounted on or removed from the camera body, change-over switches SW2 and SW4 are set to their M contacts, thereby to connect power supply battery E to circuits B1 and B2 in the camera body and to connect trigger switch SW3 in parallel with a capacitor 16. The desired exposure time is set by adjustment of an adjustable resistor 15 which is connected in series with capacitor 16 between the output terminals of the power supply battery through change-over switch SW2. Resistor 15 and capacitor 16 thereby provide an RC time-constant network which forms the manually adjustable time-function generating circuit B1.

Before the shutter is opened by actuation of the shutter-release mechanism, capacitor 16 is short-circuited by change-over switch SW4 and trigger switch SW3, which is in closed condition. When the shutter is opened, trigger switch SW3 opens, permitting the capacitor to be charged through adjustable resistor 15. Accordingly, the voltage across the capacitor increases with time after opening of the shutter at a rate determined by the setting of variable resistor 15. The electrical signal voltage at the junction of resistor 15 and capacitor 16, which decreases with time after opening of the shutter, is applied to one input of switching circuit B2, which includes transistors 17, 18, 19, 20, 21, and 22. An adjustable resistor or potentiometer 24, which is connected between the battery output terminals is through change-over switch SW2, has its center tap connected to the other input of the switching circuit. The threshold voltage or trigger level of the switching circuit is determined by the voltage of the reference signal at the center tap of potentiometer 24 and by the offset voltage of the switching circuit. Transistor 22 of the switching circuit, which was rendered conductive to energize the electromagnet when change-over switch SW2 was set to its M contact, becomes nonconductive when the voltage at the junction of resistor 15 and capacitor 16 reaches a predetermined threshold or trigger level, thereby releasing the shutter-closing member. The time interval between the opening of the trigger switch SW3 and the switching of transistor 22 into non-conduction (i.e., the exposure time interval) is determined by the setting of variable resistor 15. By adjusting the setting of potentiometer 24, the trigger level of switching circuit B2 can be set to a value which provides the proper exposure time interval.

It will be noted that no change-over switch is required for electromagnet Mg, because one of the input terminals of the electromagnet is connected to ground for both the automatic and manual modes of operation, while the other input terminal of the electromagnet is connected in common to the output terminals of switching circuits A3 and B2, which are selectively energized by the power supply battery through change-over switch SW2. Where the automatic and manually operable exposure control circuits comprise monolithic integrated circuits, electrical interference may occur between these circuits. To prevent this, the energizing output currents from switching circuits A3 and B2 may be applied to the common input terminal of the electromagnet through isolating diodes 14 and 23, respectively.

Figure 3:
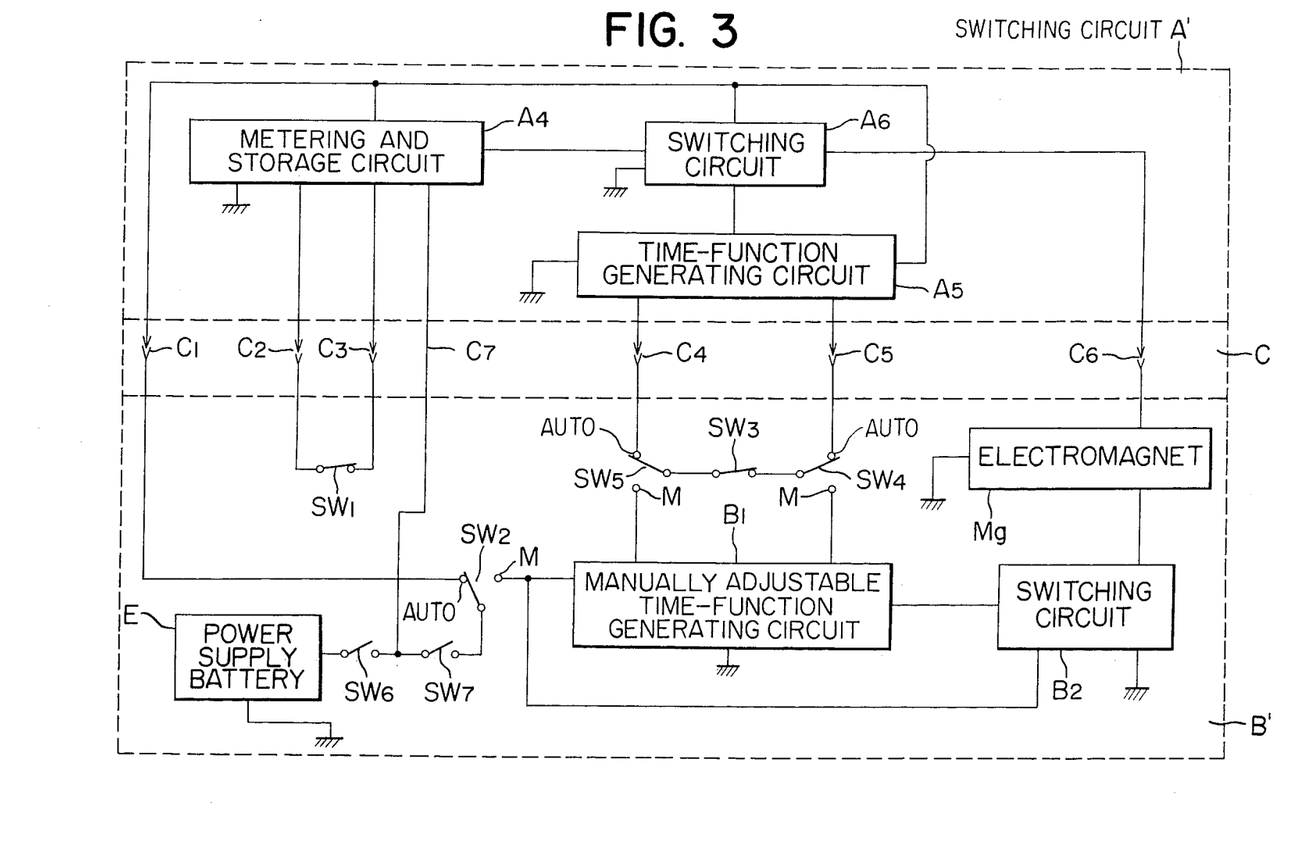
FIG. 3 is an electrical circuit diagram showing, in block form, the circuitry employed in a pentaprism device and associated camera body in a second embodiment of the camera in accordance with the invention.
Figure 4:
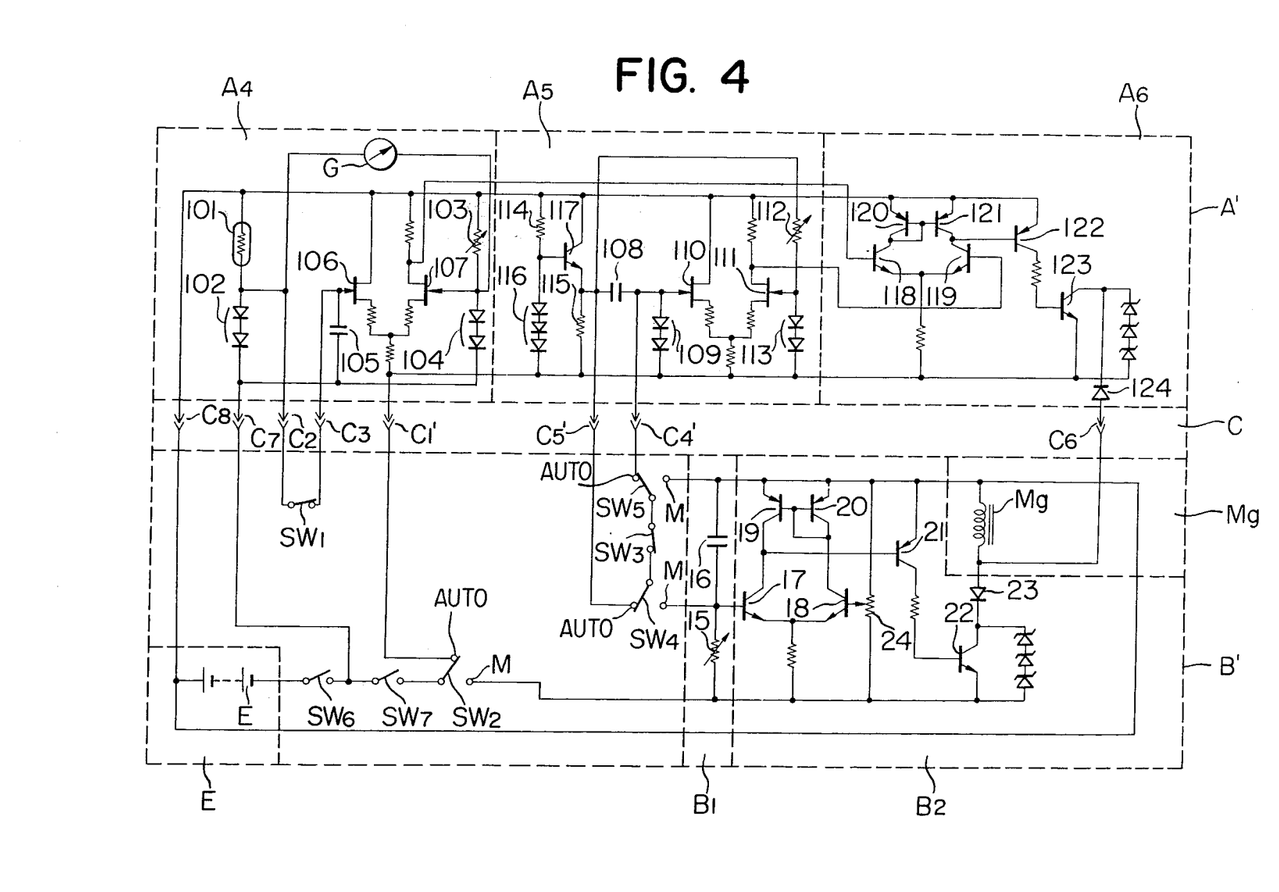
FIG. 4 is a schematic diagram of the circuitry of FIG. 3.

FIGS. 3 and 4 illustrate a second embodiment of the camera in accordance with the invention, with the automatic shutter control circuitry in the pentaprism device A' being considerably modified from that in the first embodiment. The manually operable shutter control circuitry in camera body B' is substantially similar to that of camera body B of the first embodiment, corresponding circuit elements being designated by the same reference characters.

In contrast to the first embodiment, in which the power supply battery supplies energizing potential continuously to the exposure control circuitry selected by change-over switch SW2, the camera body in the second embodiment is constructed to provide energizing potential only to the metering portion of the metering and storage circuit A4 after movement of a film-advance laver and to provide energizing potential to the exposure control circuitry selected by change-over switch SW2 after subsequent actuation of the shutter-releasing mechanism, thereby minimizing power drain on the power supply battery.

The automatic shutter control circuitry in the pentaprism device A' includes a metering and storage circuit A4, a time-function generating circuit A5, and a switching circuit A6. The metering and storage circuit A4, in addition to providing an electrical signal corresponding to the brightness of the object to be photographed and then storing such signal, produces an additional electrical signal corresponding to the $f$-value of the picture-taking lens and the film sensitivity and includes an ammeter G for providing an indication of the shutter speed required for proper exposure. Circuit A5 generates an electrical output signal having an amplitude which varies with time in a predetermined functional relationship (logarithmic, for example) after the opening of trigger switch SW3 in the camera body. Switching circuit A6 compares the output signal of the metering and storage circuit A4 with the output signal of the time-function generating circuit A5 and provides an energizing current to electromagnet Mg until such time as these signals attain a predetermined relationship, at which time the switching circuit cuts off the energizing current to the electromagnet to release the shutter-closing member.

An additional change-over switch SW5 is associated with trigger switch SW3 and is adapted to be operated with change-over switches SW2 and SW4. When the change-over switches are set to their M contacts, opposite terminals of trigger switch SW3 are connected to associated input terminals of circuit B1 in the camera body. When the change-over switches are set to their AUTO contacts, the opposite terminals of the trigger switch are connected to associated terminals of circuit A5 in the pentaprism device through connector terminals C4 and C5, respectively. A first power switch SW6 is adapted to be closed in response to movement of the camera film by a film-advance lever (not shown), thereby to connect the power supply battery E to the metering circuitry in metering and storage circuit A4 through connector terminals C7. A second power switch SW7 is adapted to be closed in response to actuation of the shutter-release mechanism, as by being responsive to upward movement of the mirror in the camera body, thereby to connect the power supply battery to the remaining circuitry in the metering and storage circuit A4 and to circuits A5 and A6 through change-over switch SW2. Connector terminals C8 are provided in FIG. 4 to connect the positive terminal of the power supply battery to the corresponding power input terminals of circuits A4, A5, and A6 in the pentaprism device.

Prior to operation of the film-advance lever, power switches SW6 and SW7 are in open condition so that no energizing potential is applied to any of the circuitry in the camera body or in the pentaprism device. In response to operation of the film-advance lever, switch SW6 closes, causing a photoconductive element 101 and logarithmic diodes 102, which are connected in series, to be connected between the output terminals of power supply battery E through connector terminals C7 and C8 and through switch SW6. As in the first embodiment, the electrical signal at the junction of the photoconductive element and diodes 102 has a voltage proportional to the logarithm of the intensity of the light striking the photoconductive element. The closing of switch SW6 also causes an adjustable resistor 103 and logarithmic diodes 104, which are connected in series, to be connected between the output terminals of the power supply battery. The resistance value of adjustable resistor 103 is manually set in accordance with the $f$-stop of the picture-taking lens and the film sensitivity, thereby providing at the junction of resistor 103 and diodes 104 a voltage which is proportional to the logarithm of those exposure factors.

Ammeter G, which has one input terminal connected to the junction of photoconductive element 101 and diodes 102 and has the other input terminal connected to the junction of adjustable resistor 103 and diodes 104, provides an indication of the shutter speed required to properly expose the camera film for the measured light intensity and the preset exposure factors. By referring to the indicated shutter speed, the photographer may adjust the aperture setting to the most appropriate value.

Automatic shutter control is selected by setting the change-over switches SW2, SW4 and SW5 to their AUTO contacts. Switch SW6, which was closed in response to previous operation of the film-advance lever, remains closed. In response to actuation of the shutter-releasing mechanism, main switch SW7 closes so that operating potential is supplied through change-over switch SW2 and through connector terminals C1 to the remaining circuitry in metering and storage circuit A4 and also to time-function generating circuit A5 and switching circuit A6. The voltage present at the junction of photoconductive element 101 and diodes 102 and stored on capacitor 105 upon opening of the memory switch is applied to one input of a first differential amplifier circuit which is provided by field effect transistors 106 and 107. The other input of the differential amplifier receives the voltage produced at the junction of resistor 103 and diodes 104. This differential amplifier, which is energized upon closing of main switch SW7, produces a reference signal having a voltage proportional to the difference between the two input voltages. Circuit elements G and 101 through 107 just described form the metering and storage circuit A4.

Time-function generating circuit A5 includes a time-constant capacitor 108 and logarithmic diodes 109 which are connected in series between the negative terminal of the power supply battery (through switches SW2, SW7, and SW6) and the output of a constant voltage circuit including resistors 114 and 115, diodes 116, and transistor 117. Prior to opening of the shutter, capacitor 108 is short-circuited by closed trigger switch SW3 and change-over switches SW4 and SW5. Upon opening of the shutter, the trigger switch is opened, permitting the capacitor to be charged by the constant voltage circuit so that the voltage across the capacitor increases with time from opening of the shutter. Connected in parallel with capacitor 108 and diode 109 are a variable resistor 112 and logarithmic diodes 113 which are connected in series, the junction of resistor 112 and diodes 113 being connected to one input of a second differential amplifier circuit including transistors 110 and 111. The time-varying voltage at the junction of capacitor 108 and diodes 109 is applied to the other input of the differential amplifier so that the differential amplifier provides a time-varying output signal having a voltage proportional to the difference between the two input signals.

Switching circuit A6, which includes transistors 118, 119, 120, 121, 122, and 123, compares the amplitudes of the reference signal provided by metering and storage circuit A4 and the time-varying signal provided by the time-function generating circuit A5. Transistor 123, which was rendered conductive upon closing of main switch SW7 to provide an energizing current to the electromagnet, is rendered non-conductive to cut off the energizing current when the amplitude of the time-varying signal reaches a predetermined level relative to the amplitude of the reference signal, thereby de-energizing the electromagnet to permit closing of the shutter by the shutter-closing member. The time interval between opening of the shutter and switching of the transistor 123 into non-conduction (i.e., the exposure time interval) is determined by the voltage stored on capacitor 105 and by the setting of resistor 103. The amplitude of the reference signal required to provide the correct exposure time is selected by suitable adjustment of the setting of adjustable resistor 112 in the time-function generating circuit. After closing of the shutter, memory switch SW1 and trigger switch SW3 are closed and power switches SW6 and SW7 are opened.

For manual control of the exposure time, the change-over switches SW2, SW4, and SW5 are changed over to their M contacts, change-over switches SW4 and SW5 then acting to connect trigger switch SW3 in parallel with capacitor 16 of circuit B1. Closing of switch SW6 in response to operation of the film-advance lever causes the metering portion of the metering and storage circuit A4 in the pentaprism device to be energized, as in the automatic control mode described above.

Actuation of the shutter-releasing mechanism of the camera causes main switch SW7 to be closed so that operating potential is applied to circuits B1 and B2 in the camera body. Upon opening of the shutter, trigger switch SW3 opens, initiating exposure time control in the manner described above with respect to the manual mode of operation for the first embodiment.

It will be noted that two change-over switches are required to effect change-over of trigger switch SW3 in the second embodiment, because neither side of the time constant capacitor 108 in time-function generating circuit A5 is connected to a source of fixed potential. Instead, one side of the capacitor is connected to one input of the differential amplifier provided by transistors 110 and 111, while the other side of the capacitor is connected to the output of the constant voltage network which includes transistor 117. In the first embodiment, on the other hand, one side of time-constant capacitor 10 is always connected to ground potential so that only change-over switch SW4 is required to effect change-over.

Furthermore, in the second embodiment, one of the input signals to switching circuit A6 (namely, the reference signal provided by metering and storage circuit A4) varies in amplitude in accordance with the light intensity, the f-stop of the picture-taking lens and the film sensitivity, while the other input of the switching circuit (namely, the signal provided by time-function generating circuit A5) varies in amplitude with time after opening of the shutter, so that the switching circuit does not have a constant DC trigger level. Variable resistor 112 in the time-function generating circuit A5 may be adjusted to compensate for irregularities of the values of the circuit components in circuits A4 and A5 and also to compensate for variations in the offset voltage of switching circuit A6, thereby to provide the correct exposure time for each pentaprism device A'.

Thus, by providing the manually operable exposure time control circuitry in the camera body and the automatic exposure time control circuitry in the pentaprism device with separate switching circuits each having a variable resistor for setting the trigger level thereof, the exposure time interval in the automatic mode is made independent of the trigger level of the switching circuit in the camera body. As a result, a pentaprism device in accordance with the invention may be used with different camera bodies to provide accurate automatic shutter control. The interchangeability of each of the pentaprism devices of the invention is not restricted to the associated camera bodies shown in the illustrated embodiments. For example, the pentaprism device of the first embodiment may be employed with the camera body of the second embodiment. Furthermore, pentaprism devices having automatic exposure time control circuits of an entirely different type (such as digital control or control using information other than the intensity of light) or having a control circuit for special application (e.g., long-time exposure) may also be mounted on camera bodies having the manually operable exposure control apparatus of the invention, provided that the pentaprism devices are constructed to control the time interval between opening of the trigger switch and the cutting off of the current supplied to the electromagnet.

While the preferred embodiments of the invention have been shown and described, it will be apparent to those skilled in the art that changes can be made in these embodiments without departing from the principles and spirit of the invention, the scope of which is defined in the appended claims.

The invention claimed is:

1. In a camera comprising an interchangeable automatic exposure control device in combination with a camera body removably connected thereto, said camera body containing a shutter, shutter-releasing means actuatable to open said shutter, manually adjustable exposure time control means which is responsive to actuation of said shutter-releasing means to produce a first electrical signal and which includes first switching means responsive to said first electrical signal for producing a first control signal representative of a selected exposure time interval, and shutter-closing means responsive to said first control signal for closing said shutter at the end of said selected exposure time interval; said interchangeable device containing light-responsive automatic exposure time control means responsive to actuation of said shutter-releasing means to produce a second electrical signal and which includes second switching means responsive to said second electrical signal for producing a second control signal representative of the exposure time interval required for proper exposure, said shutter-closing means being responsive to said second control signal for closing said shutter at the end of said required exposure time interval; said camera further comprising change-over means for causing said first and second control signals to be applied selectively to said shutter-closing means; the improvement comprising means for individually adjustably setting the switching thresholds of said first and second switching means required for the production of said first and second control signals in response to said electrical signals, respectively, whereby exposure times may readily be standardized irrespective of variations of said switching means.

2. A camera according to claim 1, wherein said camera body contains a trigger switch adapted to be operated in response to actuation of said shutter-releasing means, said manually adjustable exposure time control means being responsive to operation of said trigger switch for providing said first control signal, and wherein said automatic exposure time control means is responsive to operation of said trigger switch for providing said second control signal.

3. A camera according to claim 2, wherein said camera body includes a memory switch adapted to be operated in response to actuation of said shutter-releasing means prior to operation of said trigger switch, wherein said light-responsive means includes storage means responsive to operation of said memory switch for storing said electrical signal, and wherein said automatic exposure time control means is responsive to said stored signal and to operation of said trigger switch for providing said second control signal.

4. A camera according to claim 1, wherein said camera body further includes a source of operating potential, and wherein said change-over means comprises means for selectively connecting said source to said manually adjustable exposure time control means and said automatic exposure time control means.

5. A camera according to claim 1, wherein said shutter-closing means comprises an electromagnet which, when energized, restrains a shutter-closing member to permit the shutter to remain open and which, when de-energized, releases said shutter-closing member to close said shutter, said electromagent being responsive to the selected control signal for being de-energized at the end of the associated exposure time interval.

6. A camera according to claim 1, wherein each of said exposure time control means includes means for generating corresponding electrical signal having an amplitude which varies with time after opening of said shutter and means for providing a reference signal, and wherein the associated switching means provides the corresponding control signal in accordance with the relative amplitudes of said time-varying and reference signals.

7. A camera according to claim 6, wherein said setting means comprises means for adjusting the relative amplitudes of the time-varying and reference signals in each of the said exposure time control means.

8. A camera according to claim 7, wherein the adjusting means comprises adjustable resistors.

9. A camera according to claim 1, wherein said automatic exposure control device comprises a pentaprism.

10. Exposure control apparatus in a camera body adapted to receive an interchangeable automatic exposure control device containing light-responsive means for generating an electrical signal corresponding to the brightness of an object to be photographed and automatic exposure time control means which is responsive to said electrical signal and which includes first switching means for generating a first control signal representative of the exposure time interval required for proper exposure, said exposure control apparatus comprising: a shutter; shutter-releasing means actuable to open said shutter; manually adjustable exposure time control means which is responsive to actuation of said shutter-releasing means and which includes second switching means for producing a second control signal representative of a selected exposure time interval; shutter-closing means responsive to said control signals for closing said shutter at the end of the associated exposure time interval; change-over means for causing said first and second control signals to be applied selectively to said shutter-closing means; a source of operating potential, said change-over means comprising means for selectively connecting said source to said manually adjustable exposure time control means and said automatic exposure time control means; a first power switch responsive to film advance for connecting said source to said light-responsive means and a second power switch responsive to subsequent actuation of the shutter-releasing means for connecting said source to the exposure time control means selected by said change-over means. actuatable apparatus 11. Exposure control apparatus in a camera body adapted to receive an interchangeable automatic exposure control device containing light-responsive means for generating an electrical signal corresponding to the brightness of an object to be photographed and automatic exposure time control means which is responsive to said electrical signal and which includes first switching means for generating a first control signal representative of the exposure time interval required for proper exposure, said exposure control appartus comprising: a shutter; shutter-releasing means actuable to open said shutter; manually adjustable exposure time control means which is responsive to actuation of said shutter-releasing means and which includes second switching means for producing a second control signal representative of a selected exposure time interval; shutter-closing means responsive to said control signals for closing said shutter at the end of the associated exposure time interval; change-over means for causing said first and second control signals to be applied selectively to said shutter-closing means; said appartus including a trigger switch adapted to be operated in response to actuation of said shutter-releasing means, each of said manually adjustable and automatic exposure time control means being responsive to operation of said trigger switch for providing the corresponding control signal, and said change-over means comprising means for selectively connecting said trigger switch to corresponding input terminals of said manually adjustable exposure time control means and said automatic exposure time control means.

12. A camera comprising an interchangeable automatic exposure control device in combination with a camera body, said camera body containing a shutter, shutter-releasing means actuable to open said shutter, manually adjustable exposure time control means which is responsive to actuation of said shutter-releasing means and which includes first switching means for providing a first control signal representative of a selected exposure time interval, and shutter-closing means responsive to said first control signal for closing said shutter at the end of said selected exposure time interval; said interchangeable device containing light-responsive means for producing an electrical signal corresponding to the brightness of an object to be photographed and automatic exposure time control means which is responsive to said electrical signal and to actuation of said shutter-releasing means and which includes second switching means for producing a second control signal representative of the exposure time interval required for proper exposure, said shutter-closing means being responsive to said second control signal for closing said shutter at the end of said required exposure time interval; said camera further comprising change-over means for causing said first and second control signals to be applied selectively to said shutter-closing means; said camera body containing a trigger switch adapted to be operated in response to actuation of said shutter-releasing means, said manually adjustable exposure time control means being responsive to operation of said trigger switch for providing said first control signal, said automatic exposure time control means being responsive to operation of said trigger switch and to said electrical signal for providing said second control signal, said change-over means comprising means for selectively connecting said trigger switch to associated input terminals of said manually adjustable exposure time control means and said automatic exposure time control means.

13. A camera comprising an interchangeable automatic exposure control device in combination with a camera body, said camera body containing a shutter, shutter-releasing means actuable to open said shutter, manually adjustable exposure time control means which is responsive to actuation of said shutter-releasing means and which includes first switching means for providing a first control signal representative of a selected exposure time interval, and shutter-closing means responsive to said first control signal for closing said shutter at the end of said selected exposure time interval; said interchangeable device containing light-responsive means for producing an electrical signal corresponding to the brightness of an object to be photographed and automatic exposure time control means which is responsive to said electrical signal and to actuation of said shutter-releasing means and which includes second switching means for producing a second control signal representative of the exposure time interval required for proper exposure, said shutter-closing means being responsive to said second control signal for closing said shutter at the end of said required exposure time interval; said camera further comprising change-over means for causing said first and second control signals to be applied selectively to said shutter-closing means; said camera body further including a source of operating potential, said change-over means comprising means for selectively connecting said source to said manually adjustable exposure time control means and said automatic exposure time control means; said camera body further including a first power switch responsive to film advance for connecting said source to said light-responsive means and a second power switch responsive to subsequent actuation of said shutter-releasing means for connecting said source to the exposure time control means selected by said change-over means.

14. A camera comprising an interchangeable automatic exposure control device in combination with a camera body, said camera body containing a shutter, shutter-releasing means actuable to open said shutter, manually adjustable exposure time control means which is responsive to actuation of said shutter-releasing means and which includes first switching means for providing a first control signal representative of a selected exposure time interval, and shutter-closing means responsive to said first control signal for closing said shutter at the end of said selected exposure time interval; said interchangeable device containing light-responsive means for producing an electrical signal corresponding to the brightness of an object to be photographed and automatic exposure time control means which is responsive to said electrical signal and to actuation of said shutter-releasing means and which includes second switching means for producing a second control signal representative of the exposure time interval required for proper exposure, said shutter-closing means being responsive to said second control signal for closing said shutter at the end of said required exposure time interval; said camera further comprising change-over means for causing said first and second control signals to be applied selectively to said shutter-closing means, both control signals being applied to the same input terminal of said shutter-closing means through associated isolating diodes.

* * * * *